UNITED STATES PATENT OFFICE.

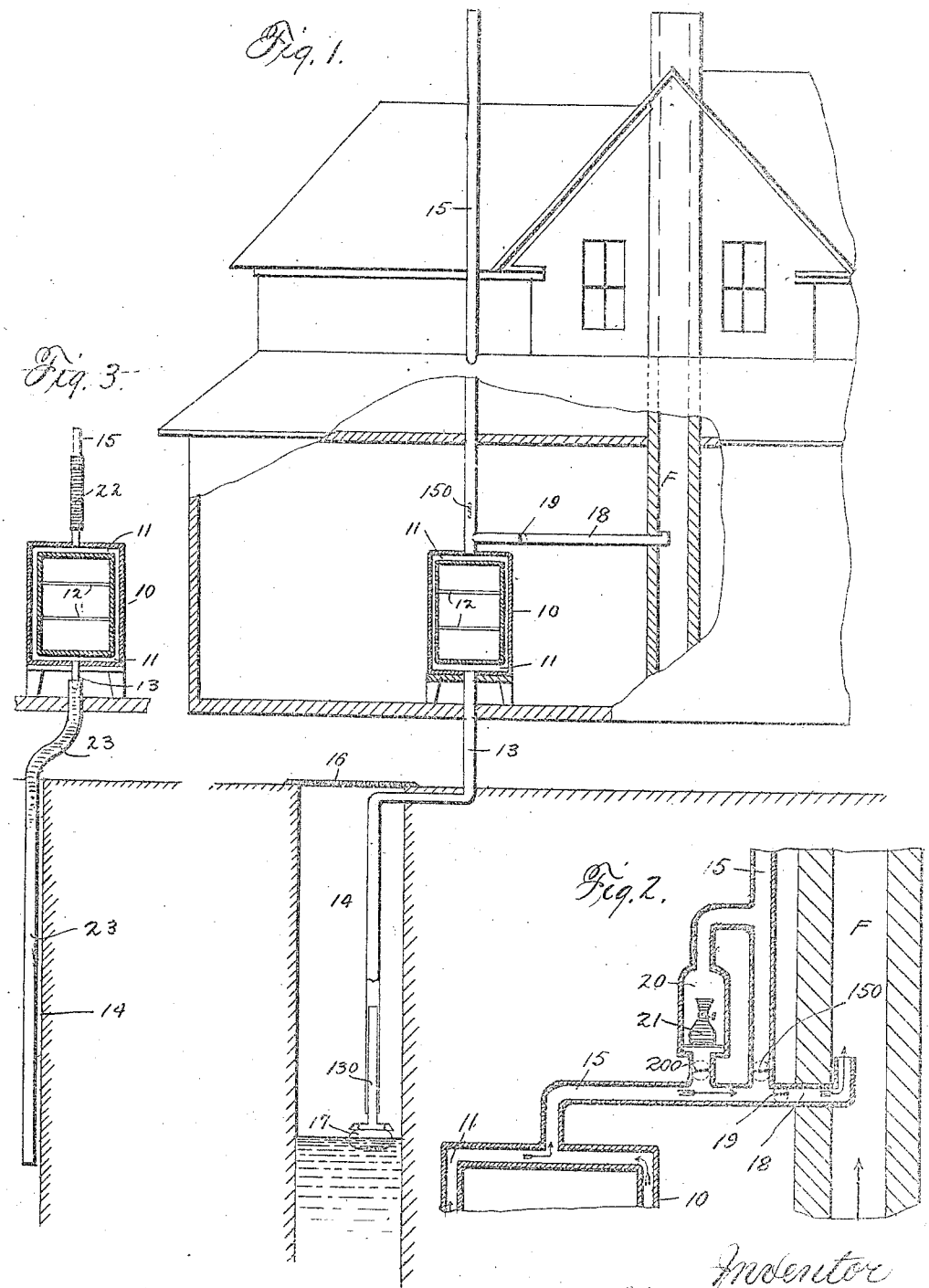

OLIN P. HALL, OF ATLANTA, GEORGIA.

FOOD-PRESERVING APPARATUS.

1,294,096.　　　　　　Specification of Letters Patent.　　Patented Feb. 11, 1919.

Application filed May 18, 1918.　Serial No. 235,279.

*To all whom it may concern:*

Be it known that I, OLIN P. HALL, of Atlanta, in the county of Fulton, and in the State of Georgia, have invented a certain new and useful Improvement in Food-Preserving Apparatus, and do hereby declare that the following is a full, clear, and exact description thereof.

The main object of my invention is economically and efficiently, and without the use of ice, or other refrigerant to produce and maintain in a food container a lower temperature in summer and a warmer one in winter, than the normal, prevailing temperature, so injury to food from high or low temperatures may be prevented, and to this end my invention consists in the apparatus constructed substantially as hereinafter specified and claimed.

In the accompanying drawings—

Figure 1 is a view, partly in section, and partly in elevation, of illustrating one embodiment of my invention;

Fig. 2 is a detail view, in section, illustrating the employment of a lamp for promoting the circulation of air.

Fig. 3, is a vertical section of another embodiment of my invention.

My invention makes use of the fact that a current or flow of air may be caused by the existence at different elevations, of strata or bodies of air of different temperatures, and, therefore, densities. I provide a cabinet, 10, which may have the general proportions and size of an ice-using refrigerator, that has double walls to provide, preferably on all sides and top and bottom, an air space 11, that thus surrounds commodities placed on suitable shelves 12, and run to said air space, at the bottom, a pipe 13 that leads from some point beneath the surface of the earth, say from a well 14, into which its lower end opens, and run from such air space, at the top, a pipe 15 that is carried to some elevated point, where it will be exposed to the direct heat of the sun,—carried say above the roof of the house or building, and on the warm side thereof. The air in the upper part of the pipe 15, by reason of its higher temperature will flow upward and out of the pipe, and thus induce a flow of colder air from the well up through the pipe 13, and through the air space 11, in the cabinet, around the articles of food therein, and producing and maintaining in summer time a lower temperature than that of the atmosphere in which the cabinet stands, yet there is no contact with the food of the air flowing from the cellar, well, or other low place.

To assure an adequate supply of fresh air to the well, it is provided with a grated top or cover 16, and to enable the inlet end of the well pipe 13 to be as low down as possible, with wells having a fluctuating level of water, said pipe has a vertically movable, telescopic section 130 that rests at its bottom upon a float 17 on the water in the well, which rises and falls with the changing level of the water and thus maintains the air inlet end of said section always the same distance above the water.

In winter, or cold weather, the heavy cold outside air, sinking into the well will force warmer air at the bottom thereof up through the air space 11, and up and out of the pipe 15 and thus maintain in such air space a supply of warmer air than the normal, and so save the cabinet contents from the hurtful effects of excessively low temperatures.

Ordinarily, the flow of air will proceed automatically, but to provide for the contingency of the existence of climate or temperature conditions that prevent automatic action, a by-pass or branch pipe 18 may be run from the eduction pipe 15 to a chimney flue, F, to utilize any draft in the latter from the use of a stove or furnace, a damper 19 being employed to open and close the passage to said flue F; or as shown in Fig. 2, the pipe 15, just above the cabinet 10, may have an enlargement or chamber 20 for holding a kerosene lamp 21 to raise the temperature and induce the draft. Said chamber 20 is in a bypass controlled by a damper 200 and the pipe 15 has a damper 150. A suitable door to give access to the lamp, is, of course, provided for the chamber 20.

The cabinet 10, has a door or doors for giving access to its interior.

When the connection is made with a cellar or other subterranean place, the incidental effect of the operation is to ventilate and purify the same.

As shown in Fig. 3, the connection between the cabinet 10 and the eduction pipe or pipes may be a section of flexible tubing or hose 22, and the pipe leading from the well may also be flexible tubing or hose 23, so as to enable the cabinet readily to be moved about without disturbing the pipe connections and also simplifying and lessening the cost of installation.

What I claim is:

1. The combination of a food container having a food holding chamber and an air space contiguous to and isolated from the chamber, and pipes that, respectively, lead to said air space from a low point of cold air supply and lead from said air space to be exposed to conditions tending to produce an upward flow of air therein, whereby a circulation of air through said space is produced.

2. The combination of a food container having a food holding chamber and an air space contiguous to and isolated from the chamber, and pipes that, respectively, lead to said air space from a low point of cold air supply and lead from said air space to be exposed to conditions tending to produce an upward flow of air therein, whereby a circulation of air through said space is produced, the pipe from the low point having a float supported movable section.

In testimony that I claim the foregoing I have hereunto set my hand.

OLIN P. HALL.